June 11, 1940. H. P. LUHN 2,204,092
APPARATUS FOR PICKING COTTON
Filed Dec. 15, 1938 5 Sheets-Sheet 3

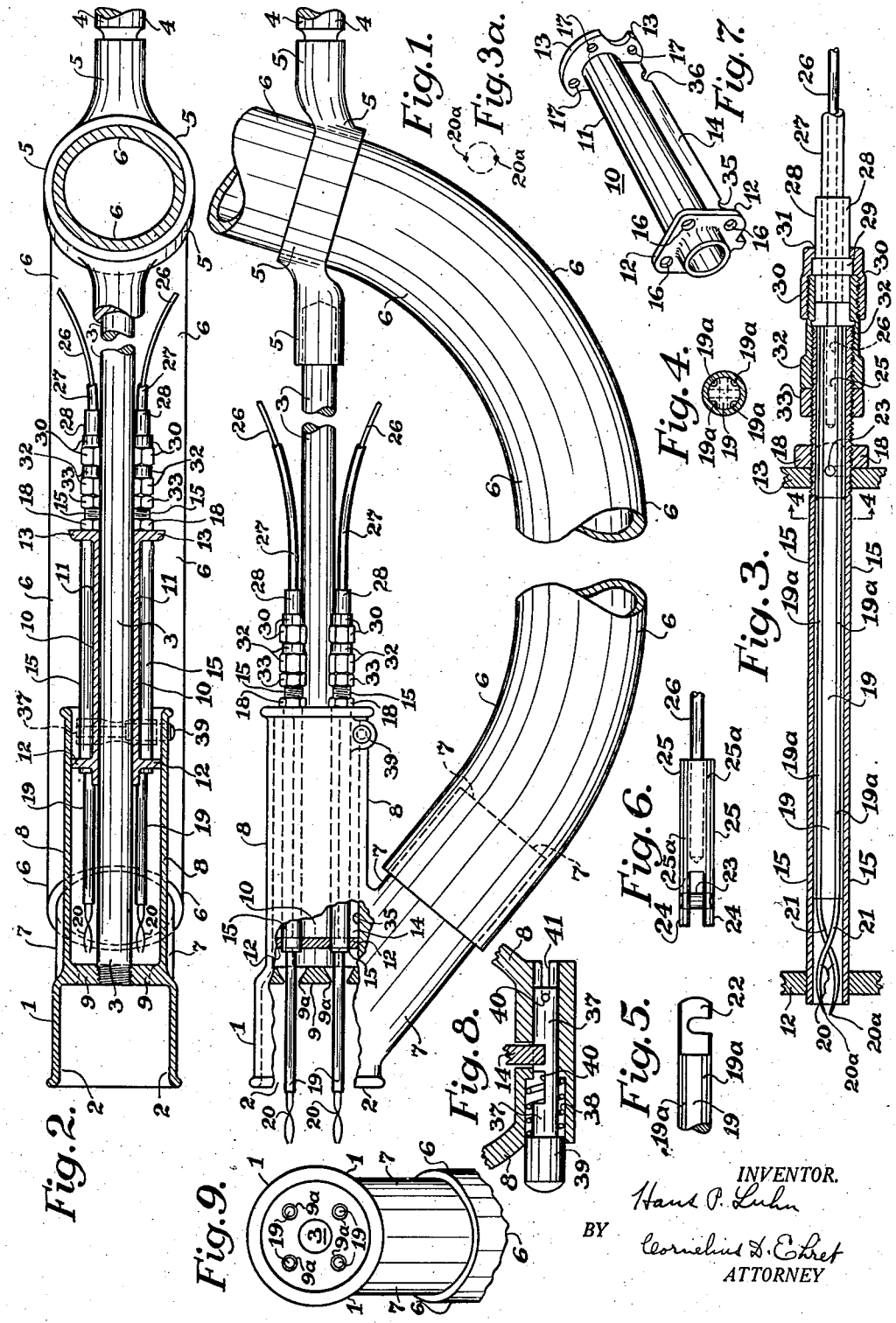

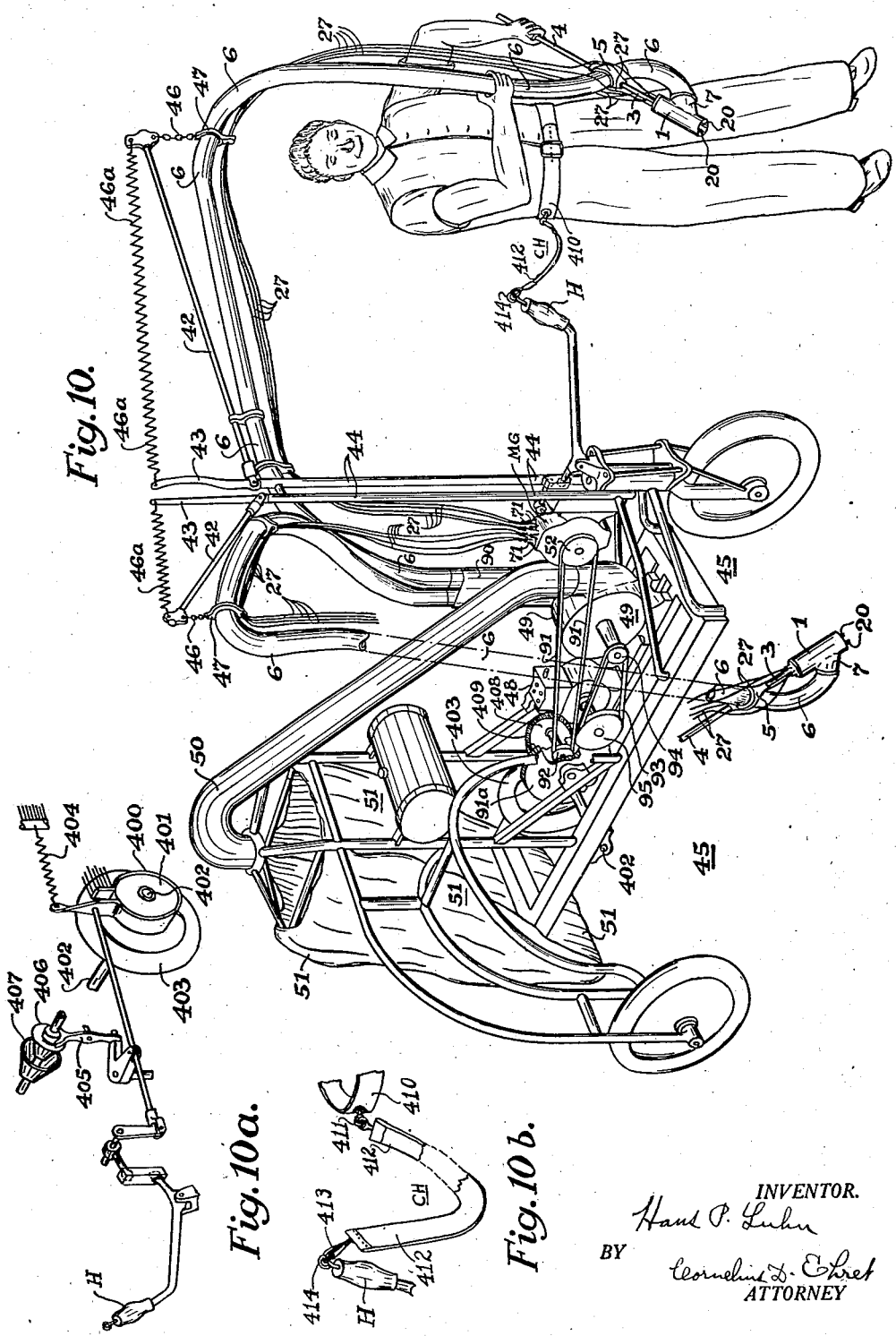

INVENTOR.
Hans P. Luhn
BY Cornelius D. Ehret
ATTORNEY

June 11, 1940.   H. P. LUHN   2,204,092
APPARATUS FOR PICKING COTTON
Filed Dec. 15, 1938   5 Sheets-Sheet 4
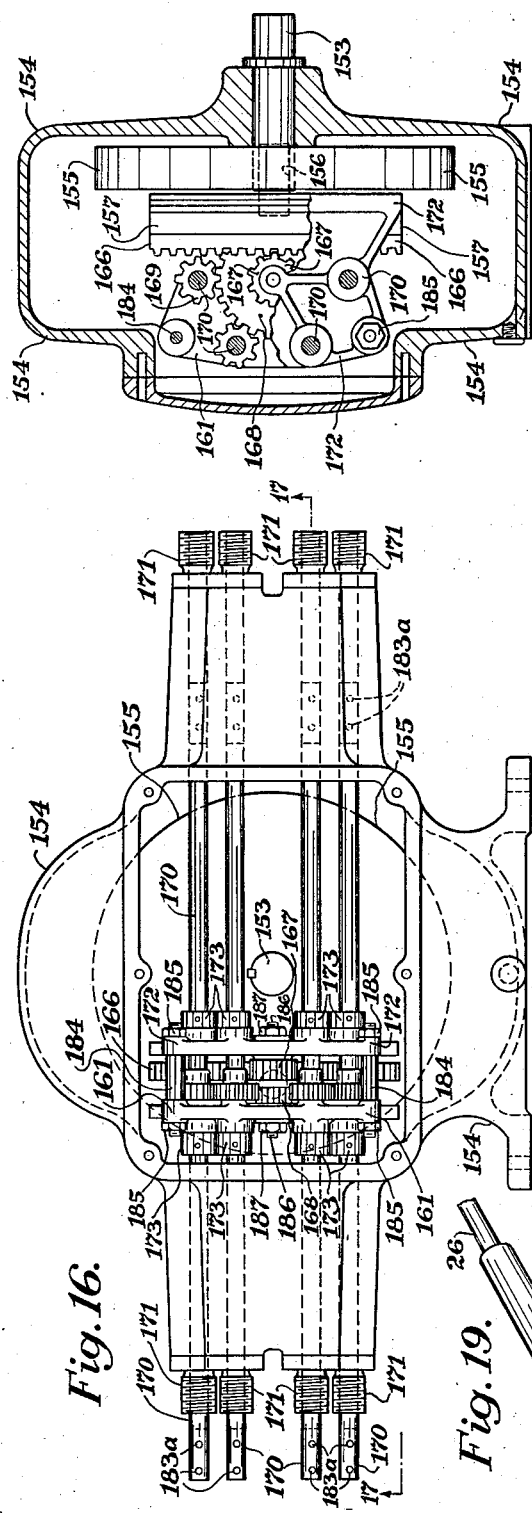
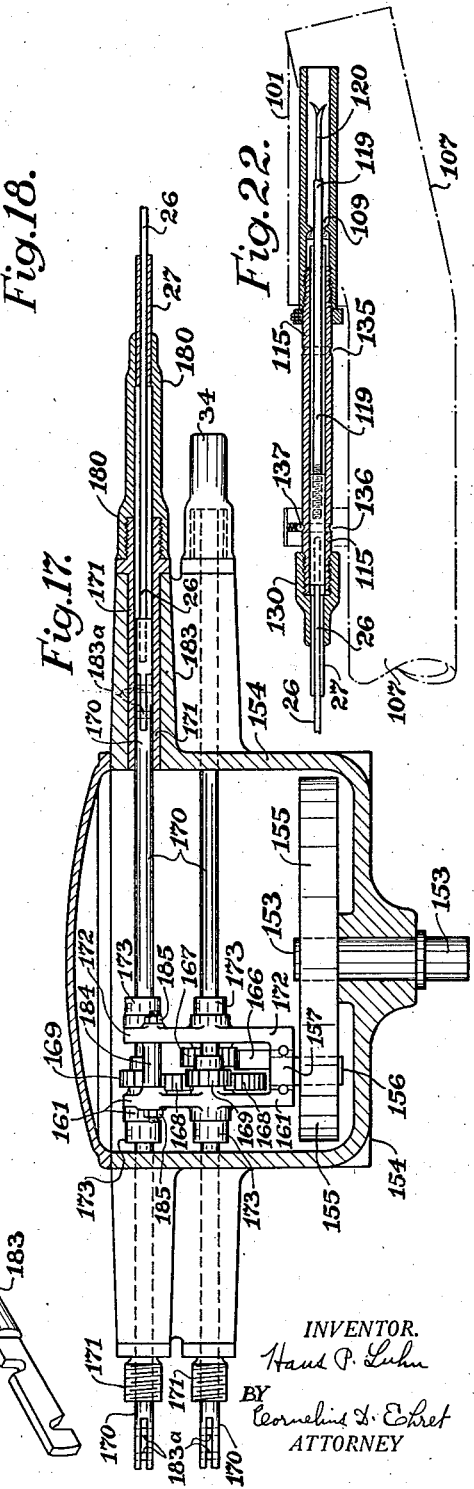
INVENTOR.
Hans P. Luhn
BY Cornelius A. Ehret
ATTORNEY June 11, 1940.  H. P. LUHN  2,204,092
APPARATUS FOR PICKING COTTON
Filed Dec. 15, 1938   5 Sheets-Sheet 5

INVENTOR.
Hans P. Luhn
BY
Cornelius D. Ehret
ATTORNEY

Patented June 11, 1940

2,204,092

UNITED STATES PATENT OFFICE 2,204,092

APPARATUS FOR PICKING COTTON

Hans P. Luhn, North Tarrytown, N. Y., assignor to John W. Geary, Jr., Houston, Tex.

Application December 15, 1938, Serial No. 245,842

42 Claims. (Cl. 56—37)

My invention relates to apparatus for picking cotton, and particularly to apparatus of the type utilizing a picking device which is carried by an operator who applies it to individual bolls in succession.

It is characteristic of my invention that, in gathering cotton from bolls by application of a picker-tool thereto, a picker-tool, in each of rapidly succeeding cycles, performs a forward and a return stroke, in each of which its speed of movement of translation varies with respect to time in accord with a continuous function or relation, substantially devoid of abrupt change in speed, at least in substantial part non-linear in character, and preferably wholly non-linear in character, as sinusoidal (harmonic) or approximately or in general sinusoidal, with attainment of maximum speed of translation well within the limits of each stroke, and preferably at about mid-stroke; the picker-tool, in each of rapidly succeeding cycles of durations equal to those of its motions of translation, rotates at an angular velocity which varies in accordance with an angular velocity-time relation or function which at least in substantial part is non-linear, and which preferably is wholly non-linear, as sinusoidal, or generally or approximately sinusoidal; the direction of rotation of the picker-tool is in opposite directions in immediately succeeding half cycles within which the angular velocity is varied as aforesaid; and the occurrence of maxima of angular velocities in the two directions of rotation are to substantial extent dephased with respect to the maxima of velocities of aforesaid motions of translation, and preferably are dephased about one-quarter cycle, whereby the maximum angular or rotational velocity prevails at or adjacent the end of the forward stroke of the picker-tool toward or into the boll, and the maximum rotational or angular velocity in opposite direction prevails at or adjacent the end of the return stroke for and during the operation of stripping cotton from the picker-tool.

In accordance with one aspect of my invention, the picking device comprises one or more suitable picker-tools or bits for engagement with cotton in the boll and actuated, as by flexible shafting, by a motion generator which imparts thereto reciprocating motion of translation for effecting movement of the picker-tools longitudinally of the head, which includes a collecting nozzle, and which also imparts to each picker-tool rotative movement varying in direction and speed during the reciprocation thereof; preferably the rotation of each picker-tool increases in angular velocity as it approaches the end of its forward stroke for removal of cotton from a boll, decreases in angular velocity as it moves toward and into the collecting nozzle, and thereafter, as it approaches the end of its return stroke, reverses in direction and increases in angular velocity in that reverse direction for removal or stripping of cotton from the picker-tool.

Also in accordance with my invention, the picking device is supported independently of the operator, as upon a flexible suction hose or articulated conduit through which the picked cotton is transported from the collecting nozzle, thus to relieve the operator of at least a substantial part of the weight of the picking mechanism; more particularly, the suction hose or conduit is suspended from a rotatable boom and is attached to the picking device at such point that the operator, with a minimum of effort and with high accuracy, may apply the picking device to bolls within a substantial area and at various vertical and horizontal positions.

Further in accordance with my invention, the motion generator and the suction pump are mounted upon a self-propelled vehicle having a control member, operable both to steer and to control propulsion of the vehicle, connected, as by a harness or strap, to the body of the operator of a manually held and/or controlled picking-head, or generally similar means, whereby, without removing his hand or hands from the picking-head, the operator may cause the vehicle to follow him from place to place of use of the picking-head.

In accordance with my invention, a motion generator comprises one or more shafts each of which is rectilinearly reciprocated by a member having rectilinear motion, or a rectilinear component of motion, substantially parallel to the axis of the shaft, and means for rotating the shaft or shafts in opposite directions and at different speeds during different portions of the cycle of rectilinear reciprocation.

More particularly, both the linear and angular reciprocations of the shaft are derived from a member, preferably continuously connected thereto, rotating about an axis substantially at right angles to the axis of the shaft; the linear component of the motion of that member which is substantially parallel to the axis of the shaft is utilized to effect linear reciprocation thereof, and the linear component of the motion of the member which is substantially at right angles to the axis of the shaft is utilized to effect rotation thereof.

My invention further resides in the features of construction, combination and arrangement as and of the characters hereinafter described and claimed.

This application is a continuation-in-part of my application Serial No. 194,528, filed March 8, 1938.

For an understanding of my invention and for illustration of preferred forms thereof, reference is to be had to the accompanying drawings in which:

Fig. 1, partly in section and with parts broken away, is a front elevational view of a picking device;

Fig. 2 is a top plan of parts appearing in Fig. 1;

Fig. 3, on enlarged scale, and in section, shows the mounting and driving connections of one of the picking spindles of Fig. 1;

Fig. 3a is an end view of the picker tool or bit;

Fig. 4 is an end view of the spindle of Fig. 3;

Fig. 5 is a fragmentary view, in front elevation, of the cable end of the spindle of Fig. 3;

Fig. 6 is a top plan view of the cable terminal of Fig. 3;

Fig. 7 is a perspective view of the retractable spindle holder of Fig. 1;

Fig. 8 is a detail view, on enlarged scale, and partly in section, of releasable retaining means for the retractable spindle holder of Fig. 7;

Fig. 9 is an end view of parts appearing in Fig. 1;

Fig. 10 is a perspective view, with some parts broken away, of a cotton-picking machine utilizing picking devices generally of the type shown in Figs. 1–9;

Figure 13:
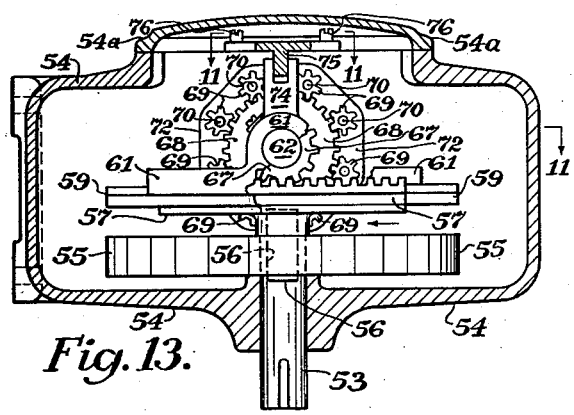
Figure 15:
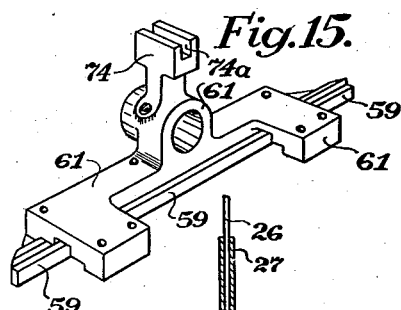
Figures 11, 12, 14:
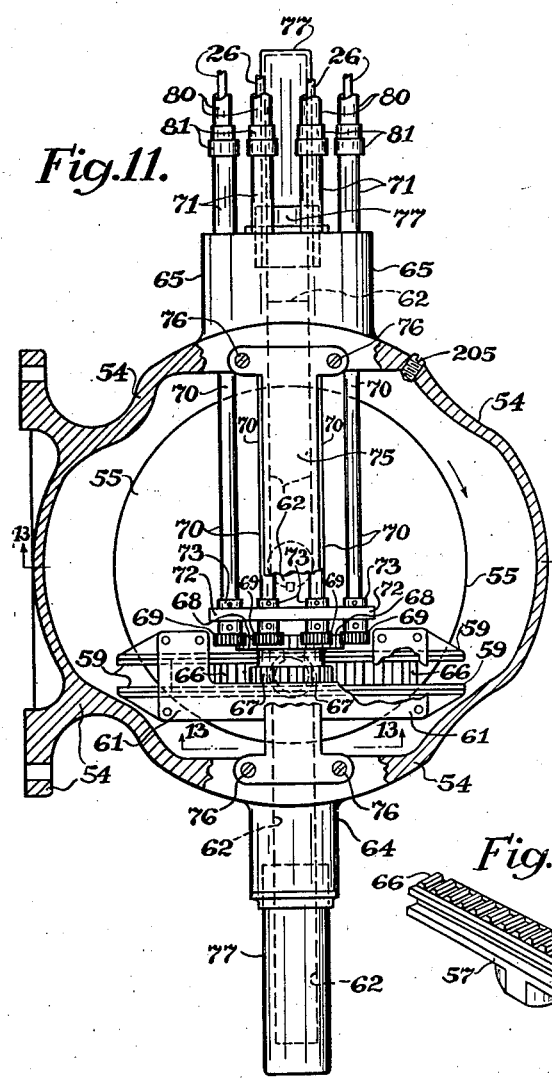
Figure 20:
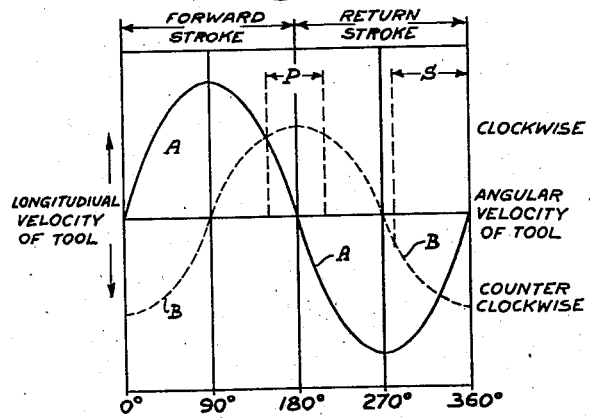
Figure 21:
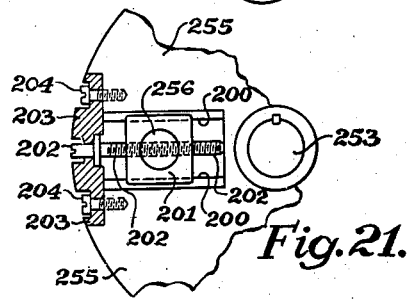

Fig. 10a, in perspective, shows control linkage for clutch and brake mechanism of the picking machine of Fig. 10;

Fig. 10b is a view in perspective of control harness shown in Fig. 10;

Fig. 11 is a front elevational view, partly in section, and with parts omitted, of a motion generator;

Fig. 12 is an end view, partly in section, of the motion generator of Fig. 11;

Fig. 13 is a plan view, partly in section, of the motion generator of Figs. 11 and 12;

Figs. 14 and 15 are perspective views of parts appearing in Figs. 11 and 12;

Fig. 16 is a front elevational view of a modified form of motion generator;

Fig. 17 is a plan view, partly in section, of the motion generator of Fig. 16;

Fig. 18 is an end view, partly in section, of the motion generator of Figs. 16 and 17;

Fig. 19, in perspective, shows the end of one of the spindles of Figs. 16 and 17;

Fig. 20 is a diagram referred to in explanation of the operation of the motion generators;

Fig. 21 illustrates a modification of an element of the motion generators; and

Figures 23, 24, 25, 26, 27:
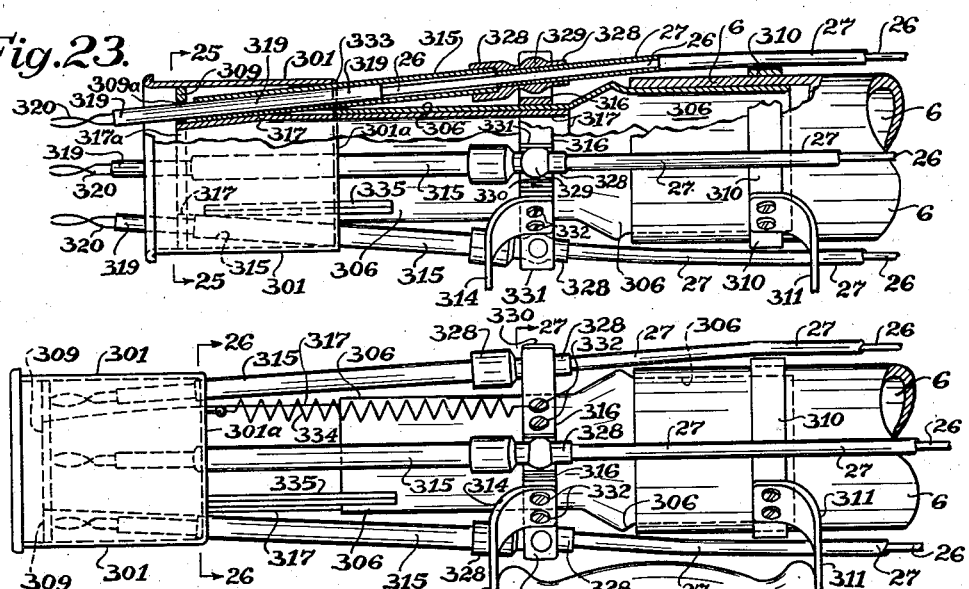

Fig. 22 is a sectional view of a modified form of picking device;

Fig. 23 is an elevational view, partly in section, of another modified form of picking device;

Fig. 24 shows parts of Fig. 23 in another position;

Fig. 25 is a sectional view taken on line 25—25 of Fig. 23 with spindles omitted;

Fig. 26 is a sectional view taken on line 26—26 of Fig. 24 with spindles omitted;

Fig. 27 is a sectional view, partly in elevation, taken on line 27—27 of Fig. 24.

The picking device shown in Fig. 1 comprises the head 1 having an opening 2 which is presented by the operator to the bolls to be picked. The operator in directing the device for picking of cotton grasps the handle member or grip 4 which is connected to the handle section 3 by the intermediate member 5 suited to surround and fit the flexible suction hose 6 in communication with the discharge tube 7 of the picking head.

Upon the bar 3 which passes through the cylinder 8 of the picking head 1 and is threadably received by the wall member 9 thereof, is slidable the spindle holder 10 which, as more clearly appears in Fig. 7, comprises a tubular section 11 which receives bar 3, two flanges 12 and 13 adjacent the opposite ends of the holder, and a rib 14 extending lengthwise of the holder and projecting from its under side. Circumferentially spaced about the cylindrical portion 11 of the holder 10 are a plurality of spindle guiding tubes 15 located in proper position by the holes 16 and 17 in the flanges 12, 13. As more clearly appears in Fig. 3, one end of each of the guide tubes 15 is screwed into and projects through the flange 13, a locking nut 18 holding the tube in place; the other end of each tube is positioned by an unthreaded hole 16 in flange 12. The spindle 19 within each of the tubes 15 is provided at its forward end with a suitable cotton-picking tool or bit 20 which preferably, as indicated in Fig. 3, comprises two pieces of steel wire, 21, 21, about #16 gauge piano wire, twisted to simulate a helix of coarse, low, pitch, i. e., low angular change per unit of axial length, as shown, but in any event preferably of a type which in effect screws into the cotton in a boll and on reverse rotation unscrews therefrom after the cotton has been detached or removed from the boll. The extreme tips 20a, 20a, are relatively widely spaced, preferably by a distance equal to the diameter of either of helices 21, 21, as indicated also in Fig. 3a; for example, aforesaid distance may range from about three sixteenths to about three eighths of an inch. Preferably, each of the spindles 19 is provided with flutes or grooves 19a extending longitudinally thereof that it may clear itself of dirt attaching thereto during the normal operation.

Opposite its tool end, each spindle is provided with a suitable means for attachment to a driving member; specifically, as more clearly shown in Fig. 5, each spindle has an integral flattened hook end 22 for detachably engaging a pin 23 extending between the tines 24 of the forked or bifurcated end of a member 25 attached to the end of a flexible shaft or cable 26 of any suitable or known construction. Member 25 is preferably provided with grooves 25a extending longitudinally thereof. Preferably, the cable 26 consists of concentric helices of suitable wire closely wound in opposite directions in adjacent layers of the cable. The cable 26 fits rather loosely in the flexible housing or casing 27 suited to retain a lubricant such as graphite or grease, and to guide the cable during its rotation and longitudinal movement hereinafter discussed.

The cable casing 27 terminates in and is suitably fastened to a fitting 28 having a ridge or ring 29 projecting therefrom intermediate its ends. The fitting 28 is locked or held in desired position by the member 30 having an opening 31 of diameter suitably small to provide a shoulder engaging one side of the ridge 29 of the casing terminal member 28. The member 30 is screwed onto the threaded member 32 until the end of member 32 abuts the other side of the shoulder 29 of fitting 28. The members 32, 30 and the terminal member 28 of the cable housing 27 can be adjusted as a unit axially of the tube 15 which is threaded to receive the member 32; these elements are held in their desired adjusted position by the lock nut 33 threadably received by tube 15.

When it is desired for any reason to disconnect the spindle from the flexible cable, it is only necessary to unscrew the member 30 and pull the cable until the spindle is clear, whereupon the cable end 25 can be detached from the hooked end 22 of the spindle.

The cables 26 effect reciprocation of the spindles 19 from the innermost position of Fig. 3 to the outermost position of Fig. 1, and during their reciprocation are rotated, all as hereinafter described. In practice, at the end of the forward stroke, the tip of the picking tool preferably extends about an inch, or slightly more, beyond the collecting nozzle. When, for any reason, it is desired to prevent the spindles from projecting beyond the front of the wall 9, the spindle holder 10 can be retracted from its normal position of Fig. 1 so that, during their reciprocation, they do not extend beyond wall 9 and so are incapable of inflicting injury or being damaged. Specifically, the rib 14 of the spindle holder 10 is provided with two notches 35, 36 in the lower edge thereof. When the spindle holder is in the forward or operating position of Fig. 1, the notch 36 embraces the locking pin 37, biased, as by spring 38, (Fig. 8) to its locking position to retain the spindle holder in its normal operating position. When the button 39 is pressed, the notch 40 in the locking pin registers with the rib 14 and so permits the spindle holder to be retracted. The holder may be held in its retracted position, Fig. 2, by engagement of notch 35 with the locking pin 37. By depressing the button 39, the spindle holder 10 may be returned to its operating position, or may be slid in opposite direction along the handle 3 to a position entirely outside of cylinder 8 of the picking head 1 where it is accessible for replacement or repair of any of its component parts. When the spindle holder is thus fully retracted, the interior of cylinder 8 is accessible for cleaning.

The locking member 37 is prevented from rotating by pin 40 extending therefrom and slidable in the slot 41, Fig. 8; the pin and slot also prevent spring 38 from expelling the locking member 37 from the picking head.

To facilitate picking of cotton by the operator and to avoid hindrance to his movements by the suction tube and/or the flexible cable housings 27, the suction hose 6 is suspended from the elevated boom 42, Fig. 10, extending from and pivotally connected to member 43 which is rotatably mounted at the upper end of mast 44 carried by vehicle 45, or equivalent structure, movable between the rows of cotton plants to various picking locations. Preferably the suction hose is suspended from the boom 42 by a flexible member 46, such as a chain, rope, or spring, and the picking device is attached to the hose 6 near the lower free end thereof. The spring 46a, connected between the member 43 and the boom 42, serves as a counterbalance, relieving the operator of at least a substantial part of the weight of the hose and the picking device. The member 46 is attached at its lower end to a ring 47 encircling the hose, and the length of hose below the supporting ring 47 is such that the picking device is at suitable height above ground, permitting the operator to reach all bolls within a substantial area by swinging the picking device to and fro, or up and down about the fulcrum afforded by the connection of hose 6 to the handle ring 5. This freedom of movement of the operator is further enhanced by the ability of the boom to rotate both vertically and horizontally and by the flexibility of the suction hose 6. All of the flexible cable casings 27 extending to a picking head 1 are suitably bound together at more or less frequent intervals and as a group held to the suction hose at suitable points.

In picking cotton from low plants, it may be most convenient for the operator to hold in one hand the handle section 4 and with the other hand grasp the hose 6 suitably above its attachment to the handle; or the operator may direct the picking head in any manner most convenient under the circumstances.

Upon the vehicle or truck 45 is mounted a suitable motion generator MG having its pulley 52 driven from a suitable prime mover 48, such as an internal combustion engine, through belt 91, pulley 92, and gear 91a in mesh with a gear on the prime mover shaft. The fan or pump 49 which provides the suction for drawing the picked cotton through the tubes 6, and the pressure for discharging the cotton through duct 50 into the bag 51 or other suitable receptacle is also mounted upon truck 45 and may be driven from prime mover 48 through belt 93 and pulleys 94 and 95.

The suction tubes 6 which extend from suction manifold 90 of pump 49 may be of flexible hose material, or for the desired flexibility, may comprise a plurality of rigid tubular articulated sections. In any event, the tubes 6 flexibly extend from suction manifold 90 to the picking devices to permit the latter by their operators to be moved with respect to truck 45 during maintenance of the continuity of the path of flow of cotton from the picking heads to the bag 51 or equivalent.

Similarly, the flexible connections, afforded by cables 26 and their casings 27, from the motion generator on truck 45 to the picking heads provide for continuous drive of the picking tools and permit the operators to move the several picking heads to various plants anywhere within a substantial area about truck 45.

As hereinafter explained, the ends of cables 26 pass through the stationary members 71 extending from the housing of the motion generator MG and are attached within the generator housing to elements having both rotation and movements, of translation or rectilinear, transmitted by the cables 26 to the picking tools.

As indicated in Fig. 10, the motion generator MG may be operatively connected by flexible cables to more than one picking device each preferably having its individual supporting boom 42. In the arrangement particularly shown, there are two picking devices so that for any given position of vehicle 45 two operators may simultaneously, and without interference to each other, pick cotton from plants within a substantial radius. By providing additional booms and picking devices, the number of operators may be correspondingly increased to any desired extent. The motion generator shown in Figs. 11 to 15, and hereinafter specifically described, is suited for supplying the necessary rectilinear, briefly linear, and angular reciprocation to the spindles of two picking devices of the type shown in Fig. 1, thus providing for picking of cotton by two operators.

The handle H of the vehicle 45 may be utilized for steering it and may also, as indicated in Fig. 10a, be associated with clutch mechanism for effecting propulsion of the vehicle from one picking location to the next by prime mover 48 and with brake mechanism for holding the vehicle stationary at a desired location. When handle H is raised to the position shown in Fig. 10a, the brake band 400 is tightened, by spring 404, upon drum 401 attached to shaft 402 of vehicle wheel 403 and arm 405 is rocked to effect disengagement of clutch members 406, 407 interposed in the driving connections from prime mover 48 to vehicle wheel 403; when handle H is lowered the brake is released and the engine 48 connected to wheel 403 to effect self-propulsion of the machine through the clutch 406, 407, sprocket 408 and chain 409, Fig. 10; preferably, the spring 404, Fig. 10a, biases the handle to its "raised" position so that whenever the operator ceases to pull down on the handle, the spring 404, concurrently with return of the handle H to the position shown in Figs. 10 and 10a, resets the brake 404 and effects disengagement of clutch members 406, 407, thus to bring the vehicle 45 to rest.

In picking cotton, the operator usually at frequent intervals moves short distances, forward, or from place to place; to avoid need for the operator to release the manually held and/or controlled picking head or tool for manual actuation of the control handle H of vehicle 45, there is provided means, as a harness CH, suitably connected between the control handle H and the body of the operator. In the example shown in Figs. 10 and 10b, the harness CH comprises a belt 410 for encircling the operator's waist, or leg, or other portion of the operator's body other than his hand or hands, and having a swivel connection 411 to member 412 whose other end has a spring clip 413 for detachable connection to the eye 414 on handle H. The member 412 may be rigid, like a rod, or, preferably, may be a strap or cord.

As the operator moves to another picking station or place, the strap 412 becomes taut, and then, for further forward movement of the operator, pulls down the handle H to release the vehicle brake 400 and concurrently to effect engagement of clutch members 406, 407, whereupon the vehicle follows the operator under its own power; when the operator stops, the vehicle continues to move for a short distance whereupon the strap 412 becomes slack, so allowing spring 404 to raise handle H and so effect, as above described, resetting of the brake 400 and disengagement of the clutch members 406, 407 whereupon the vehicle stops at the new location. The course of the vehicle, during its forward movement, corresponds with that of the operator because movement of the operator to the right or left with strap 412 taut effects corresponding steering movement of handle H to the right or left.

The provision of harness CH allows the operator, whose hands are occupied with holding and/or manipulation of the picking tool or head to proceed without attention to his position with respect to vehicle 45; when the operator advances to a new picking location, the vehicle follows without any voluntary or consciously distinct control by the operator other than the forward and/or lateral movement of his body, his hands remaining occupied with the picking head. This feature of my invention, though of particular importance in picking cotton, may be utilized to advantage in other situations, for example power spraying, in which the operator will manipulate structure having connection with components of the apparatus, too bulky or heavy to be carried by the operator, on a self-propelling and/or steerable vehicle.

The spindles 19 of the picking devices are preferably linearly reciprocated at high speed, for example about 160 cycles per minute, so that complete removal of the cotton boll is insured without need for the operator to hold the picking head at the boll for more than a very brief interval.

As will hereinafter more clearly appear, the picking tools 20 rotate in one direction as the spindles 19 emerge from the opening 2 of the picking head to engage fibres of the cotton boll, and are rotating at their maximum speed when the spindles are at their outer position in engagement with the cotton boll. As the picking needle or tool 20 is retracted and brings the cotton thereon into the collecting nozzle, the rotation of the tool reverses in effect to unscrew the cotton therefrom, which is thereupon drawn by suction downwardly through the discharge tube 7 of the picking head and ultimately is discharged into bag 51. The spindles in moving toward their fully retracted position pass through the closely fitting openings 9a in the wall 9 of the picking head and thus any cotton remaining on the picking tools 20 is stripped therefrom. Preferably, the openings 9a in the wall 9 increase in cross-sectional area toward the head or flange 12 of the spindle holder and the flange 12 is suitably spaced from the rear face of wall 9, thus to provide a space in which dirt and trash picked up by the spindles collect instead of fouling the guide tubes 15 of the spindles. From time to time the spindle holder 10 may be retracted, as above described, for cleaning.

Referring to Figs. 11 to 15 which disclose a preferred form of motion generator MG of Fig. 10, the pulley shaft 53 extends through a wall of the housing 54 and there is secured thereto interiorly of the housing the rotary driving member or fly-wheel 55. Upon the crank pin 56, which projects from the face of the fly-wheel, is pivotally mounted the member 57 (Fig. 14) having recesses 58 extending longitudinally on opposite sides thereof to receive the guides 59, 59 attached as by screws 60 to the member 61, of configuration more clearly shown in Fig. 15, suitably attached to the vertically reciprocable bar 62 extending parallel to the face of the fly-wheel and supported at its opposite ends by the stationary bearing members 63, 63 which are secured within the extensions 64, 65 of the motion generator housing 54.

When shaft 53 is continuously rotated in one direction, the engagement between the member 61 57 pivoted to the fly-wheel and the member 61 secured to the member 62 effects vertical linear reciprocation of the member 62 and all parts connected thereto. Assuming the fly-wheel is rotating in clockwise direction, Fig. 11, and starting with the parts in the position shown, the bar 62 moves upwardly for the first half revolution of the fly-wheel and then reverses its movement and moves downwardly for the next half revolution of the fly-wheel. Moreover, and as indicated by curve A, Fig. 20, the speed at which the bar moves varies during its reciprocation; again starting with the parts in the position shown in Fig. 11, the upward movement of bar 62 to the right increases in velocity, or accelerates, for the first quarter revolution (0° to 90°) of the fly-wheel, decreases in velocity, or decelerates, for the next quarter revolution (90° to 180°), and momentarily becomes zero at 180° of the fly-wheel cycle; for the next half revolution of the fly-wheel, the bar 62 moves downwardly with increasing velocity or accelerated speed from 180° to 270° of the fly-wheel cycle and then decreases in velocity as the parts again approach the position shown in Fig. 11. For purposes of explanation, the upward stroke of member 62 is termed its "forward" stroke and the downward movement thereof is termed its "return" stroke. This linear movement of the bar or plunger 62 is utilized, as hereinafter described, to effect linear reciprocation of the spindles 19 of the picking heads.

The mechanism for effecting rotation of the picking spindles is now described. As most clearly shown in Fig. 14, the member 57 pivotally mounted upon the fly-wheel 55 is provided with a rack 66 for engaging a gear 67 mounted upon and free to rotate with respect to the reciprocable bar 62. Again assuming the fly-wheel 55 is rotating in clockwise direction, Fig. 11, and that the parts start from the position shown in Fig. 11, for the first quarter revolution of the fly-wheel, the gear 67 rotates in clockwise direction, Fig. 13, for the next half revolution of the fly-wheel (90° to 270°, Fig. 20) rotates in counterclockwise direction, and for the next quarter revolution of the fly-wheel again rotates in clockwise direction and continues to do so until the 90° point of the next fly-wheel cycle. As more readily apparent from curve B of Fig. 20, the angular velocity of the gear 67 and of all parts, including shafts 70, connected thereto or driven thereby is at a maximum in one direction when the slidable member 61 having zero linear velocity is in the position shown in Fig. 11, and is at maximum in the opposite direction when member 61 again having zero linear velocity is at the other end of its stroke, and is zero for intermediate positions of member 61 substantially corresponding to the 90° and 270° points of the fly-wheel 55. The change in angular velocity of the shafts 70 is smoothly continuous throughout the cycle; from 0° to 90° there occurs smooth deceleration of rotation of shafts 70; from 90° to 180° there occurs smooth acceleration of the shafts 70 in reverse direction; from 180° to 270° there is smooth deceleration of the reverse rotation; and from 270° to the end of the cycle there is smooth acceleration of the shafts 70 and tools 20 in their original direction of rotation.

In brief, in the mechanism specifically illustrated, the bar 62 has linear harmonic motion, the gear 67 thereon has angular harmonic motion, and these motions are substantially 90° out of phase.

The gear 68, integral with or attached to gear 67, is in mesh with a plurality of gears 69 each secured to one end of a shaft 70 whose other end is slidably received by a bearing tube 71 in the housing extension 65. The shafts 70 are maintained circumferentially spaced around the linearly reciprocable bar 62 by the supporting member 72 suitably secured to the bar 62. The thrust members or collars 73 secured to the shafts 70 provide for their movement in unison with shaft 62 as the slidable member 61 moves downwardly; the hubs of the gears 69 serve a similar purpose as the slide member 61 moves in the reverse direction. To prevent rotation of the slidable member 61, it is provided with an extension 74 having a slot or groove 74a for reception of the guide bar 75 suitably secured as by the screws 76 to the housing member 54.

In operation the housing 54 is partly filled with oil, and to prevent escape of lubricant the housing extensions 64, 65 are provided with caps 77, sufficiently long to avoid obstruction to reciprocation of the plunger 62. The cover 54a is removable to permit assembly of and access to the mechanism within the housing. Preferably the member 62 is hollow, closed at its upper end by plug 78, and is provided adjacent its upper end with a series of circumferentially spaced holes 62a and nearer its lower end with one or more holes 79. During the up-stroke of the plunger 62, the oil passes through the hole 79 of the plunger, thence into the hollow interior thereof and into the lower cap 77; during the down-stroke of the plunger the oil is sprayed from the holes 62a in the plunger onto the shafts 70, thus to effect lubrication thereof. The upper bearing for plunger 62 is provided with a groove for flow of air into and out of the space within cap 77, above the closed end of the plunger. The motion of the fly-wheel and the other movable parts is also effective to assist in the lubrication of parts within the housing.

From the foregoing description, it is to be understood that during rotation of the fly-wheel 55, each of the shafts 70 moves linearly generally in accord with curve A of Fig. 20, and during this linear reciprocation of the shafts 70 they are rotated first in one direction and then in the other at varying speed, generally in accordance with curve B of Fig. 20.

When the motion generator is utilized to supply motion to cotton-picking devices of the character herein described, the shafts 70, as above stated, are preferably linearly reciprocated about 160 cycles per minute, and during each cycle of linear movement the shafts 70 preferably turn about eight revolutions, a total of four revolutions in one direction, and a total of four revolutions in the opposite direction. More specifically referring to Fig. 20, the shafts 70 revolve about four revolutions in one direction while the fly-wheel 55 is moving from the 90° point to 270° point of a cycle, and revolve in opposite directions, while the fly-wheel is moving from the 270° point of one cycle to the 90° point of the next linear cycle. Because of the character of the construction, these revolutions, though continuous in both directions, are not uniformly spaced in time during a cycle of longitudinal movement; there are more revolutions of shafts 70 when they are near the limits of their longitudinal movement than when they are intermediate those limits.

At the motion generator each of the flexible cables 26 from picking heads 1 is attached to one of the spindles 70 of the motion generator. As appears in Fig. 12, the flexible housing or casing 27 for each shaft 26 is permanently attached to a suitable hollow terminal member 80 which is drawn to and held against the end of a tube 71 by a nipple 81 which screws onto the bearing tube 71 and is provided with a flange for engaging the shoulder or ridge 82 on the terminal member 80. To the end of each flexible shaft 26 is secured a terminal member 83 having a hooked end similar to the hooked end 22, Fig. 5, for detachable engagement with the pin 84 extending across the forked end of the associated shaft 70.

Because of their connection to the shafts 70 of the motion generator, the picking tools 20 are rotating at maximum velocity in one direction while moving toward and from their outermost or picking position, and are rotating in maximum velocity in reverse direction while moving from and toward their innermost position for removal of the picked cotton by the combined effects of reversed rotation of the tools 20, suction, friction between the cotton on the tools and the inner walls of the collecting nozzle, and the stripping action occurring as the tools withdraw from the nozzle through openings 9a in wall 9 thereof.

The picker tool starts from momentary rest at its fully retracted position O, Fig. 20, graph A, progressively increases in speed, in its longitudinal movement or motion of translation during its forward stroke toward the boll, to maximum speed at or about mid forward stroke, and decreases in speed for the remainder of the forward stroke to momentary rest, whereupon it begins its return stroke within which its speed again increases and decreases generally as in the forward stroke.

During each of its said strokes it makes several revolutions. The relation of speed of rotation of the picking tool with respect to time is at least in substantial part not a simple "linear" function (which term, linear function, is employed in the sense of simple proportionality between speed and time); it is any suitable relation or function characterized by absence of abrupt changes in speed, preferably entirely non-linear, and more particularly is a sinusoidal, approximately sinusoidal, or generally like function or relation of speed to time. In Fig. 20 this relation or function is illustrated, graph B, as wholly non-linear, and particularly as sinusoidal or approximately so, though that figure shall be taken as generically representative of a speed-time relation or function which is at least in substantial part non-linear, as aforesaid, but nevertheless devoid of abrupt changes in speed.

The relation with respect to time of the longitudinal velocity or speed of translation of the picker-tool, in its forward and return strokes, is that broadly and specifically above stated respecting the relation of speed of rotation to time, and in Fig. 20 is represented by graph A, which, though preferably sinusoidal, or generally or approximately so, shall be taken as representative of a speed-time relation or function which is substantially devoid of abrupt changes in speed, and either wholly or at least in substantial part a non-linear relation or function.

As indicated in Fig. 20, the maximum angular velocities of the picker-tool do not in time coincide with its maximum speeds of translation; on the contrary, they are to substantial extent dephased, within each of the cycles of tool reciprocation of which only one is illustrated, preferably, and as illustrated, by about one-quarter cycle or 90°, equivalent to about one-half of each forward and return stroke of the picker-tool.

While the longitudinal motion of the picking tool, as more particularly herein described, may be characterized by forward and return strokes which are accomplished in equal periods of time, it will be understood that the forward and return strokes may be performed within unequal periods of time, and that the maximum speed of translation in one of these strokes may be greater or less than the maximum speed attained in the other.

The picking of cotton by tools 20 occurs—during a cycle of their longitudinal movement—within or throughout the range indicated by P, Fig. 20, during which interval the tools are rotating in maximum velocity in picking direction; the time during which the tools are actually in contact with the boll depends upon the proximity of the picking-head thereto, the adjustment of the picking spindles, the stroke of the tool, the tendency of the boll to be drawn into the head during retraction of the tools, and other factors; but in general, the distance P, Fig. 20, represents at least approximately that portion of a cycle of the longitudinal movement of tools 20 during which they gather cotton from a boll.

The stripping or removal of the gathered cotton from the picking tool may begin approximately with the beginning of, and because of, the reverse rotation of the picking tools during their return stroke, that is, about midway of the return stroke, Fig. 20, and continues during interval S during which the tools rotate at maximum velocity in their reverse or stripping direction. In the particular construction shown in Fig. 1, the stripping action is substantially finished when the tools 20 pass through the apertures 9a in the wall 9 of the housing; i. e., the interval S may terminate somewhat before the end of the return stroke of the spindles; but, by change of construction which, in effect, shifts the apertures 9a longitudinally with respect to the end of the return stroke of the spindles, the stripping period S may be decreased, or, conversely, may be increased to include part of the next forward stroke of the tools.

Because of the dephased relation between the rectilinear reciprocation and angular reciprocation of the picker tool 20, and because of the correlation of the direction of rotation of the tool with respect to the direction of twist of the picker wires 21, the picker wires "stab" the mass of cotton fibres, i. e. advance quickly deep into the boll of cotton before they are rotated to substantial extent, or in any event before they are rotated at high velocity, to wind cotton fibres thereon and thus avoid premature balling of cotton on the end of the picker tool which would prevent its sufficiently deep penetration essential to gather all the cotton of a boll in minimum number of strokes; this screwing or threading of the picker wires into the boll at high velocity of rectilinear translation occurs in that part of the "forward stroke", Fig. 20, before beginning of picking within the aforesaid range P and more or less approximately at beginning of "clockwise" rotation of the picker tool; within the range P, the velocity of rectilinear translation of the tool is low, affording a relatively long fraction of a cycle of the tool during which it is within the boll, and during this time, the angular velocity of the picker wires 21 is high, for winding up thereon the fibres of the boll, and remains high for part of the return stroke of the tool. Also because of the aforesaid relations, rectilinear return movement of the tool into the head 1 is effected at high velocity, to provide a quick plucking of any fibres wound on the tool and remaining attached to the boll, and to afford a relatively long fraction of a cycle during which the tool has low velocity of rectilinear translation within the picker head and during which the tool rotates at high velocity in the unwinding or reverse direction to ensure complete or substantially complete removal of the picked cotton.

The aforesaid low pitch of the helical picking wires effects low resistance to their rapid penetration into the boll, preferably substantially entirely accomplished, as aforesaid, during rapid forward movement in approximately the latter half of the forward stroke, characteristic A, Fig. 20.

The linear stroke of the picking tools 20, which corresponds to about twice the radial distance between the axes of the crank-pin 56 and shaft 53 of the motion generator, may be varied as hereinafter described in connection with Fig. 21. The number of revolutions of each spindle 19 for each stroke thereof is in general proportional to the length of stroke, and depends also upon the ratio of the diameters of the gears 67, 68, 69 of the motion generator and, as above stated, is preferably about 8 revolutions; the number of revolutions of the spindle per stroke or linear reciprocation thereof can be changed to any other desired value by proper selection of the gear ratios.

The motion generator shown in Figs. 16 to 18 is quite similar to that shown in Figs. 11 to 13, the principal difference being that in the motion generator of Figs. 16 to 18 there is omitted an element corresponding to the sliding bar 62 of Figs. 11 to 13 and the element corresponding to slidable element 61 of Figs. 11 to 13 is supported by the shafts 170 corresponding to shafts 70 of Figs. 11 to 13.

The shaft 153 of the driving pulley 52 of the motion generator is attached interiorly of the housing 154 to a flywheel 155 through which extends the crank-pin 156 providing a pivotal mounting for the member 157 vertically reciprocable between the frame members 161, 172 which are supported for linear reciprocation parallel to the face of fly-wheel 155 by the shafts 170. The two frame members 161, 172 are held at suitable distance from each other by the spacing members 184 which pass through the frame members and are provided with threaded ends to receive the nuts 185. The shaft 186 extending between the frames and fastened thereto by the nuts 187 rotatably supports a gear unit comprising the gear 167 and the gear 168 attached thereto and in mesh with the gears 169 circumferentially spaced about gear 168. The gears 169 are secured, respectively, to the shafts 170 to effect rotation thereof when gear 167 in mesh with rack 166 is rotated thereby.

Preferably there are provided the thrust members 173, each pair of which is secured to a shaft 170 on opposite sides of the slidable carriage formed by the frame members 161, 172.

From the prior description of the motion generator of Figs. 11 to 13, it will be understood that, as the fly-wheel 155 of Figs. 16 to 18 continuously rotates in one direction, that component of motion of the member 157 which is parallel to the shafts 170 is effective, because of engagement between member 157 and the frame members 161, 172, to produce one cycle of linear reciprocation of the shafts 170 for each revolution of the fly-wheel 155, and it will further be understood that the component of motion of the rack member 157 which is at right angles to the shafts 170 is effective to impart angular reciprocation thereto because of the driving connections including the rack 166 and gears 167, 168, 169.

Each end of each of the bearing tubes 171 which support the ends of the shafts 170 is provided exteriorly of the motion generator housing with a threaded extension for reception of a cable terminal member 180 which is suitably attached to the flexible casing 27 and whose inner diameter is suited to form an extension of the bore of the bearing tube. Each of the flexible cables 26 is terminated by a member 183 suited detachably to connect it with an end of a shaft 170; specifically, as shown in Fig. 19, the cable terminal member 183 may be provided with a double hooked end for receiving pins 183a extending between the tines of the forked end of the shaft 170. When for any reason a flexible cable is not connected to an end of a shaft 170, the open end of the bearing tube 171 is closed by a suitable safety cap 34, Fig. 17.

The motion generators of Figs. 11 to 13 and of 16–18 may be utilized for supplying motion to one or more picking nozzles of the type shown in Fig. 1, or for any other purpose requiring concurrent linear and angular reciprocation.

The linear stroke of the shafts 70 of the motion generator of Figs. 11 to 13 or shafts 170 of the motion generator of Figs. 16 to 18 may be made adjustable by recourse to the construction shown in Fig. 21. The fly-wheel 255, generically illustrative of fly-wheel 55 of Fig. 11 and fly-wheel 155 of Fig. 16, is provided with a radial guide slot 200 for the block 201, from which projects the pivot pin 256 for the rack member 57 of Fig. 12 or rack member 157 of Fig. 17. The block is threaded to receive the adjusting screw 202 which passes through the insert 203 suitably held in position to the fly-wheel periphery as by the machine screws 204. The end of the screw 202 is suitably shaped or slotted to receive an adjusting tool which may be inserted through a hole, such as hole 205, Fig. 11, in the motion generator casing, to adjust the position of block 201 and therefore the stroke of the generator.

Either of the motion generators described may be utilized to provide linear and angular reciprocating motion for picking devices other than the type shown in Fig. 1; for example, either of them may be used in connection with a picking head of the type shown in Fig. 22. In this modification, a single spindle 119 reciprocable in a guide tube 115 is provided at one end with a picking tool 120 and at its other end is suitably detachably connected to a flexible cable 26 having a flexible housing 27 secured to the terminal member 130 screwed upon the end of the guide tube 115. The other end of the guide tube 115 is positioned in the picking head 101 and has intermediate its ends a stuffing box 109 through which the spindle 119 passes for connection to the picking tool 120. The flexible shaft 26 is connected to a suitable motion generator to effect reciprocation of the picking tool 120 from its retracted position of Fig. 22 to picking position suitably beyond the open end of the suction tube 107. The forward end of guide tube 115 passes diagonally through a wall of the suction tube 107 and terminates short of the open end thereof so that as the picking tool or needle moves from the picking position toward the retracted position, Fig. 22, the picked cotton is removed or unscrewed therefrom by the reverse rotation of the picking tool, by the stripping action of the end of head 101, and by suction. The cable 26 not only reciprocates linearly, but, during the linear movement, rotates preferably in the manner above explained in connection with curve B of Fig. 20.

The guide tube 115 may be releasably held in its operative position, Fig. 22, by engagement between a spring-pressed detent 137 and a notch or groove 136 in the guide tube 115. The guide tube may be withdrawn from the suction tube 107 for cleaning or other purposes by pulling it to the left, Fig. 22, until the detent 137 engages the second groove 135 in the guide tube 115 thus to hold it in the retracted position.

In the modified form of picking device shown in Figs. 23 to 27, the end of the suction hose 6 is held to one end of a tubular insert 306 by the clamping ring 310 to which is secured one of the brackets 311 for a handle 313; the other supporting bracket 314 of the handle is attached to the clamping ring 316 suitably secured to the tubular member 306 beyond the end of the suction hose 6. Tubular member 306 slidably receives telescopic tubular member 317 which is attached to the rear wall 301a of the suction head 301 and at its cotton-receiving mouth or orifice 317a to the stripping plate or disk 309 secured within the suction head near the forward open end thereof. Each of the four spindles 319 having at the forward end thereof a picking tool or needle 320 is slidably received by a guide tube 315 suitably attached to a member 328 which forms a terminal for the housing 27 of the flexible cable 26 to which is imparted linear and angular movement as heretofore described in connection with the other picking devices herein disclosed. The rounded or ball portion 329 of each of the terminal members 328 snaps into a spring clip provided by resilient members 330, 331 suitably attached, as by screws 332, to the ring 316. Each member 331 is provided with a hole which in effect forms a socket for receiving the ball-shaped or rounded member 329 of the terminal member 328, and the other resilient element 330 retains the terminal element 328 in place. Each of the guide tubes 315 is therefore in effect pivotally mounted upon the ring 316. The spindle guiding tubes 315 pass through openings 333 in the rear wall 301a of the picking head 301 and lie within the grooves 332, Fig. 25, at the forward end of the slidable member 317. During their rectilinear or longitudinal reciprocation, the spindles 319, respectively inclined to the axis of member 317, move from a position for which the forward ends of the picking tools 320 are to the rear of the stripping plate 309 to the fully advanced position, Fig. 23, for which they are in contact with the cotton in a boll. Because of the aforesaid inclination of the guide tubes 315, the linear movement of the spindles has a component parallel to the axis of tube 317 and a component normal to said axis, therefore the tools 320, during the forward stroke of the spindles, converge to enter a cotton boll. Moreover, as will be understood from the description of prior modifications, as the tools advance to the picking position, Fig. 23, they are rotating in direction to screw into cotton in a boll and continue to rotate in that direction as the spindles retract to carry the picked cotton into the picking head. When the cotton, last detached from the boll, has been retracted to or within the picking head, the direction of rotation of the spindles reverses with effect to unscrew or remove the tool 320 from the cotton; as tool 320 withdraws through aperture 309a in stripping plate 309 any cotton remaining on the tool is stripped therefrom; the cotton so freed is drawn by suction into the open end 317a of the tubular member 317 and thence through tube 306 and suction tube or hose 6, and ultimately to suitable receptacle such as bag 51, Fig. 10. During their retractive movements, the picking tools 320 draw apart or away from the axis of the picking head 301, because the axes of the tools 320 and spindles 319 are not parallel but diverge toward the ring 316.

The springs 334, each connected at one end to the ring 316 and at its other end to the picking head 301, bias the head 301 to the right, as viewed in Fig. 23, with the forward end of the tubular member 306 serving as a stop for the rear face 301a of the picking head.

The guide bars 335, suitably attached to the outer surface of the tubular member 306, extend through the holes 336 in the rear wall 301a of the picking head 301. When the device is not in use, the picking head 301 is by hand pulled to the left to the position shown in Fig. 24 to clear the ends of the guiding rods 335 and is then rotated through a small angle to move holes 336, Fig. 26, out of line with rods 335, so that, after removal of the hand, springs 334 hold the head 301 in the position shown in Fig. 24, the front ends of the guide members 335 serving as stops. For this position of the head 301, the picking tools 320, even though they continue to reciprocate, never project beyond the stripping plate 309 and are therefore protected from injury. The aforesaid ball-and-socket mountings of the guide tubes 315 at 329 permit them to swing from their normal positions as the head 301 is slightly rotated, as aforesaid, to bring holes 336 out of register with the ends of the guide bars 335. To restore the picking head to its operating position, Fig. 23, it is only necessary to slightly rotate the head 301 in reverse direction until the holes 336 in the rear wall thereof are in alignment with the guide bars 335, whereupon the springs 334 are effective to return the head to the position shown in Fig. 23.

To pick cotton, an operator, holding the device by the handle 313, presents the open end of the head 301 to a cotton boll, whereupon the tools 320, operated by a suitable motion generator such as either of those herein described, remove the cotton from the boll and, as aforesaid, carry it into the head 301 wherein it is freed, and then carried by suction to a suitable receptacle.

Though preferred forms of apparatus have been illustrated and described, it is to be understood my invention is not limited thereto but is coextensive in scope with the appended claims.

What I claim is:

1. A cotton-picking machine comprising a picking device having a linearly and angularly reciprocable picking tool, a structure movable to different picking locations, a motion generator on said structure for producing linear and angular motions, and a flexible shaft extending from said motion generator to said picking device to transmit said linear and angular motion to said tool thereof and to permit use of said device within a substantial area for each location of said structure.

2. A cotton-picking machine comprising structure movable to different picking locations, a motion generator on said structure for producing reciprocatory linear motion and reciprocatory angular motion, a boom rotatably supported in elevated position by said structure, a picking device having at least one movable tool, flexible means for suspending said picking device from said boom, and flexible means extending from said motion generator to the picking device to transmit said reciprocatory motions to the picking tool thereof.

3. A cotton-picking machine comprising structure movable to different picking locations, a motion generator on said structure for producing angular and rectilinear motions, suction producing means on said structure, a manually-directed picking device comprising one or more tools adapted to rotate during longitudinal movement, and flexible connections from said motion generator and said suction producing means to said picking device for transmitting said motions from said generator to said tools and for withdrawing gathered cotton from said picking device by suction.

4. Cotton-picking apparatus comprising a picking head, a picking tool supported by said head for reciprocation and rotation with respect thereto, and means for operating said tool comprising means in driving relation to said tool for effecting its reciprocation, and means in driving relation to said tool for effecting rotation thereof constructed to effect progressive increase of angular velocity of the tool as it approaches the limits of its reciprocation and to effect reversals of the direction of its rotation in positions intermediate said limits.

5. Cotton-picking apparatus comprising a picking head, a picking tool supported by said head for reciprocation and rotation with respect thereto, and means for operating said tool comprising means coupled to said tool for effecting its longitudinal reciprocation into and out of said head, and means coupled to said tool for effecting its rotation at maximum velocity at the limits of its reciprocation and reversal of its direction of rotation when the velocity of its longitudinal movement is substantially at its maximum.

6. Cotton-picking apparatus comprising a picking head including a picking tool supported thereby for reciprocation and rotation with respect thereto, and means for operating said tool comprising means in driving relation to said tool for effecting its reciprocation, and means in driving relation to said tool for effecting rotation thereof constructed to effect progressive change in the angular velocity of the tool throughout each reciprocation thereof and reversal of the direction of rotation of the tool as it passes a position intermediate the limits of its reciprocation.

7. Cotton-picking apparatus comprising a picking head, a spindle supported by said head, a picking tool thereon, a flexible cable connected to said spindle, and means in driving relation to said cable for imparting longitudinal and angular reciprocation thereto so to effect longitudinal movement of said tool and rotation thereof in opposite directions at opposite ends of its linear stroke.

8. Cotton-picking apparatus comprising a picking head, a picking tool movably supported by said head, means for generating linear harmonic motion and angular harmonic motion, and means connected between said tool and said generating means for transmitting linear harmonic motion and angular harmonic motion from said generating means to said tool.

9. Cotton-picking apparatus comprising a picking head, a picking tool movably supported by said head, a motion generator including longitudinal and angularly reciprocating structure, and a flexible cable connected between said tool and said motion generator for transmitting the longitudinal and angular movements of said structure to said tool.

10. A cotton-picking device comprising a picking head, a plurality of spindles, each having a picking tool, means in driving relation to said spindles for reciprocating said tools with respect to said head for picking of cotton, and supporting structure for said spindles mounted within said head and constructed for removal with the spindles from its normal picking position within said head.

11. A cotton-picking device comprising a picking head having openings at opposite ends thereof, a spindle holder constructed for retraction from its normal position within the head through one of said openings, one or more spindles carried by said holder and each having a picking tool, and means in driving relation to said spindles for reciprocating said tools with respect to the other of said openings for picking of cotton.

12. A cotton-picking device comprising a picking head, a spindle holder within and constructed for retraction with respect to said head, reciprocating means, one or more spindles carried by said holder and each having a picking tool normally reciprocated by said reciprocating means into and out of said head, means for retaining the spindle holder retracted in such position that the picking tools reciprocate entirely within the head, and means operable to release said retaining means.

13. A cotton-picking device comprising a picking head, an extension thereon, reciprocating means, a spindle holder constructed to slide on said extension toward and from its normal position, one or more spindles carried by said holder and each having a picking tool reciprocated by said reciprocating means into and out of said head when said holder is in its normal position, means for retaining the spindle holder retracted in such position that the picking tools reciprocate entirely within the head, and means operable to release said retaining means.

14. A picking device comprising a picking head having a collecting chamber, one or more spindle-guiding tubes within said head, reciprocating means, longitudinally and angularly reciprocable spindles individual to said tubes and having picking tools movable by said reciprocating means into and out of said chamber, said spindles having longitudinal grooves to minimize wear of the tubes by foreign matter lodging on the spindles during their operation.

15. A picking device comprising a picking head having a collecting chamber, a wall of said chamber having an aperture, reciprocating means, a spindle reciprocated thereby, a picking tool on said spindle for reciprocation through said aperture, and a guide tube for the spindle disposed within the head and terminating short of said wall to afford space for accumulation of foreign matter carried into the head by the tool during its operation.

16. A manually-applied cotton-picking device comprising a plurality of picker-tools, mechanism connected to said tools for effecting their simultaneous operation, and means supporting and spacing the tools to provide a boll-engaging area in which they are concurrently effective to gather cotton.

17. Cotton-picking apparatus including a picking tool comprising a plurality of wires projecting from a movable member, and means connected to said member for effecting reciprocation and rotation thereof constructed to move said wires deeply into a boll by motion which is predominantly rectilinear and then to effect motion of said member which is predominantly rotative to wind fibres of the boll on said wires.

18. Cotton-picking apparatus including a picking tool comprising a plurality of wire helices projecting from a movable member, and means connected to said member for effecting reciprocation and rotation thereof constructed to rotate said member in such direction during its movement toward a boll that said wire helices quickly screw deeply into the boll and thereafter rotate more rapidly in the same direction to wind thereon fibres of the boll.

19. Cotton-picking apparatus including a picking tool comprising a plurality of wire helices projecting from a movable member, and means connected to said member for effecting rectilinear and angular reciprocations thereof which are substantially harmonic and to such extent dephased as to effect rapid rotation of said helices at and near the limits of their rectilinear motion and to effect rapid rectilinear motion of said helices intermediate said limits and while their angular velocity is low.

20. Cotton-picking apparatus comprising a picking head, a picking tool comprising a plurality of wires projecting from a reciprocable member, mechanism connected to said member for moving it in one direction to project said wires into a boll to which said head is presented and in reverse direction to carry cotton picked from the boll into the head for stripping, and mechanism connected to said member for effecting rotation of said wires at high velocity in one direction while in the boll and at high velocity in reverse direction in said head, and for effecting their rotation at low velocity during their entry into the boll and during retraction of the wires and the cotton thereon from the boll into said head.

21. Apparatus comprising a self-propelled vehicle including a control member operable to effect propulsion of the vehicle from a prime mover, a tool for manipulation by an operator and connected to apparatus on said vehicle, and means for connecting the body of the operator to said control member to effect actuation of said control member for self-propulsion of the vehicle toward the operator whenever the operator moves in advance of the vehicle beyond a predetermined distance and without need to relinquish manual control of said tool.

22. Apparatus comprising a self-propelled vehicle including a control member operable to effect propulsion of the vehicle from a prime mover, a tool for manipulation by an operator and connected to apparatus on said vehicle, and harness including a flexible member for connecting the body of the operator to said control member tensioned by movement of the operator to effect actuation of said control member for self-propulsion of the vehicle whenever required to follow the operator and without need to relinquish manual control of said tool.

23. Apparatus comprising a self-propelled vehicle including a control member operable to effect propulsion of the vehicle from a prime mover and to steer the vehicle, a tool for manipulation by an operator and connected to apparatus on said vehicle, and means for connecting the body of the operator to said control member to effect its actuation for steering and self-propulsion of the vehicle whenever required to follow the operator and without need to relinquish manual control of said tool.

24. Cotton-picking apparatus comprising a plurality of wires in the form of helices of coarse pitch, and means connected to said wires for reciprocating and rotating them in unison in such directions and at such relative rectilinear and angular velocities that their tips quickly penetrate deeply into the cotton and thereafter at then higher angular velocity effect and maintain their grip upon the cotton.

25. Cotton-picking apparatus comprising a plurality of wires in the form of helices of coarse pitch and having widely spaced tips, and means connected to said wires for reciprocating and rotating them in unison in such directions and and at such relative rectilinear and angular velocities that their said tips quickly penetrate deeply into the cotton and thereafter at then higher angular velocity effect and maintain their grip upon the cotton.

26. Harvesting apparatus comprising a manually-directing picking head, a picking tool rotatably and slidably mounted in said head, a flexible motion-transmitting cable connected at one end to said tool, and a motion generator for effecting angular and linear reciprocation of said tool comprising a member continuously rotating in one direction, and mechanism interposed between said member and the other end of said cable for converting the continuous rotation of said member into angular reciprocation and linear reciprocation both transmitted by said cable to said tool.

27. A motion generator comprising a rotatable member, structure pivotally mounted on said member for rotation therewith about the axis thereof, and a second rotatable member slidably engaged by said structure for rotation thereby alternately in opposite directions and for at least one revolution in each direction for each revolution of said first rotatable member.

28. A motion generator comprising a rotatable member, driving means therefor, structure mounted for rotation with said member pivoted thereon at a distance from the axis thereof, means for preventing angular displacement of said structure about its pivotal axis during its rotation with said member, and a second rotatable member engaged by said structure for rotation thereby in opposite directions at different times during each revolution of said first rotatable member.

29. A motion generator comprising a rotatable member, driving means therefor, a rack pivotally mounted on said member at a distance from its axis of rotation, a second rotatable member capable of axial reciprocation, a frame slidably engaging said rack and connected to said second member to impart reciprocation thereto, and gearing between said rack and said second member to effect angular reciprocation of said second member.

30. A motion generator comprising a rotatable member, driving means therefor, structure pivotally mounted on said member at a distance from the axis thereof, a second rotatable member capable of axial reciprocation, and means connecting said structure to said second member to effect by a component of motion of said structure axial reciprocation of said second member and to effect by another component of motion of said structure rotation of said second member alternately in opposite directions and for at least one revolution in each direction.

31. A motion generator comprising a rotatable member, driving means therefor, a second rotatable member reciprocable along its axis of rotation and substantially at right angles to the axis of rotation of said first member, a third member supported for reciprocation with said second rotatable member and precluded from rotation therewith, and structure rotatable about the axis of said first member in continuous engagement with both said second and third members to effect substantially dephased linear and angular reciprocations of said second member.

32. A motion generator comprising a housing, a plurality of shafts guided for linear reciprocation within said housing, a frame reciprocable with said shafts, a rotatable member within said housing, structure pivotally mounted on said member for rotation therewith about the axis thereof and engaging said frame to effect reciprocation of said shafts, and means including said structure for effecting angular reciprocation of said shafts during their linear reciprocation.

33. A motion generator comprising a housing, a plurality of shafts guided for linear reciprocation within said housing, gears secured to said shafts respectively, a frame reciprocable with said shafts, a main gear movable with said frame and in mesh with said shaft gears, a rotatable member within said housing, and a rack pivotally mounted on said member for rotation therewith about the axis thereof engaging said frame to effect linear reciprocation of said shafts and driving said main gear to effect angular reciprocation of said shafts.

34. Apparatus for converting rotary motion into reciprocatory angular motion comprising two members rotatable about fixed axes, structure mounted for rotation with one of said members pivoted thereon at a distance from the axis thereof, means for preventing angular displacement of said structure with respect to its pivotal axis, and means connecting said structure to the other of said rotatable members to effect rotation thereof in opposite directions for each revolution of said structure about the axis of said one of said rotatable members.

35. A motion generator comprising a housing, a linearly reciprocable member, structure for supporting said member within said housing and for preventing its angular displacement, a spindle reciprocable with and free to rotate with respect to said member and extending through wall structure of said housing for external connection to means utilizing its motions, and mechanism within said housing for effecting linear reciprocation of said member and dephased angular reciprocation of said spindle.

36. A motion generator comprising a rotatable member, a rack member pivotally mounted thereon at a distance from the axis of rotation thereof, and a gear mounted for rotation about a different axis continuously engaged by said rack for rotation of said gear in opposite directions for each revolution of said rotatable member.

37. A motion generator comprising a rotatable member, a member pivotally mounted thereon at a distance from its axis of rotation, a second rotatable member, structure slidably engaged by said pivotally mounted member and reciprocable with said second rotatable member, means precluding rotation of said structure with said second rotatable member, and a member, rotated by its engagement with said pivotally mounted member, rotatable with said second rotatable member, and reciprocable with said structure.

38. A motion generator comprising a housing, a plurality of parallel spindles within said housing and guided by wall structure thereof, a frame with respect to which said spindles are rotatable and linearly movable with them within said housing, a member rotatable within said housing about an axis normal to the direction of linear movement of said frame, structure pivotally mounted upon said member and in sliding engagement with said frame to effect linear reciprocation of said frame and said spindles by rotation of said member, and means effecting angular reciprocation of said spindles including a rotatable member rotated by engagement with said structure, linearly reciprocable with said frame, and rotatable in unison with said spindles.

39. A motion generator comprising a rotatable member, a driving member therefor linearly reciprocable in a direction transverse to the axis of said member and engaging it in a plane parallel to said axis, structure for guiding said driving member during aforesaid reciprocation and itself linearly reciprocable in direction parallel to said axis, and a member rotatable about an axis substantially normal to said directions and having at a distance from its axis a pivotal connection to said driving member.

40. A motion generator comprising a plurality of linearly reciprocable members, each rotatable about its own axis, a common rotatable driving member therefor, structure linearly reciprocable with said members, and structure rotatable about an axis substantially normal to the direction of reciprocation of said members in slidable engagement with said linearly reciprocable structure to effect its linear reciprocation and in engagement with said common rotatable driving member to effect drive of said plurality of rotatable members thereby.

41. A motion generator comprising a housing, a cylinder, a hollow reciprocable plunger one of whose ends moves within said cylinder, a port in said plunger for controlling flow of lubricant from said housing to said cylinder, a frame reciprocable with said plunger, at least one spindle reciprocable with said frame and extending through wall structure of said housing, means for reciprocating said plunger, and an orifice in said plunger for discharge onto a spindle of lubricant pumped from said cylinder by reciprocation of said plunger therein.

42. A motion generator comprising a housing, aligned cylinders, a hollow reciprocable plunger within said housing and whose ends move within said cylinders, a port in said plunger for controlling flow of lubricant from said housing to one of said cylinders, an air vent for the other of said cylinders, a frame reciprocable with said plunger, at least one spindle reciprocable with said frame and extending through wall structure of said housing, means for reciprocating said plunger, and an orifice in said plunger for discharge onto a spindle of lubricant pumped from said one of said cylinders by reciprocation of said plunger therein.

HANS P. LUHN.

CERTIFICATE OF CORRECTION.

Patent No. 2,204,092. June 11, 1940.

HANS P. LUHN.

It is hereby certified that error appears in the printed specification of the above numbered patent requiring correction as follows: Page 5, second column, line 48-49, for the word "directions" read --direction--; page 11, first column, line 68, claim 37, after "member" strike out the comma; and that the said Letters Patent should be read with this correction therein that the same may conform to the record of the case in the Patent Office.

Signed and sealed this 28th day of January, A. D. 1941.

(Seal)

Henry Van Arsdale,
Acting Commissioner of Patents.